United States Patent
Lantwin et al.

(10) Patent No.: US 10,127,204 B2
(45) Date of Patent: Nov. 13, 2018

(54) CUSTOMIZED SYSTEM DOCUMENTATION

(71) Applicant: CA, Inc., Islandia, NY (US)

(72) Inventors: Christian Johannes Lantwin, Moers (DE); Carol L. Piccus, Herndon, VA (US)

(73) Assignee: CA, Inc., Islandia, NY (US)

( * ) Notice: Subject to any disclaimer, the term of this patent is extended or adjusted under 35 U.S.C. 154(b) by 13 days.

(21) Appl. No.: 15/343,205

(22) Filed: Nov. 4, 2016

(65) Prior Publication Data

US 2018/0129637 A1    May 10, 2018

(51) Int. Cl.
  *G06F 17/22* (2006.01)

(52) U.S. Cl.
  CPC ...... *G06F 17/2247* (2013.01); *G06F 17/2229* (2013.01); *G06F 17/2264* (2013.01)

(58) Field of Classification Search
  CPC .................................................. G06F 17/243
  See application file for complete search history.

(56) References Cited

U.S. PATENT DOCUMENTS

| | | | | |
|---|---|---|---|---|
| 6,799,205 | B2 * | 9/2004 | Ludtke | H04L 12/2805 709/217 |
| 6,981,207 | B1 * | 12/2005 | Bakman | G06F 17/243 714/E11.188 |
| 9,122,496 | B1 * | 9/2015 | Jhoney | G06F 8/73 |
| 9,495,145 | B1 * | 11/2016 | Brech | G06F 8/65 |
| 2001/0051962 | A1 * | 12/2001 | Plotkin | G06F 17/243 715/229 |
| 2007/0214427 | A1 * | 9/2007 | Peck | G06F 9/4446 715/771 |
| 2016/0020963 | A1 * | 1/2016 | Jhoney | H04L 41/5074 709/219 |
| 2017/0094021 | A1 * | 3/2017 | Brech | H04L 67/34 |
| 2017/0115983 | A1 * | 4/2017 | Brech | G06F 8/65 |
| 2017/0116448 | A1 * | 4/2017 | Brech | G06K 7/10366 |

* cited by examiner

*Primary Examiner* — Asher D Kells
(74) *Attorney, Agent, or Firm* — Alliance IP, LLC (57) ABSTRACT

A documentation file is received that includes a plurality of sections and user system parameter data is accessed that identifies attributes of a computing system of a particular user. A subset of the plurality of sections are determined to be presented to the particular user based on the attributes of the computing system and a value for inclusion in content of a particular one of the subset of sections is determined based on the attributes. A customized version of the documentation file is presented on a display device that includes the particular section, omits sections in the plurality of sections outside the subset of sections, and includes the value in presentation of the particular section.

20 Claims, 8 Drawing Sheets

CUSTOMIZED SYSTEM DOCUMENTATION

BACKGROUND

The present disclosure relates in general to the field of electronic media generation, and more specifically, to intelligently generating system-customized documentation.

In the past documentation was paper based. Preparing documentation for a very specific environment or customer tended to be expensive as printing documents in an affordable way tended to require economies of scale. As a consequence documentation was often written to apply to a large audience group order to allow for high printing numbers. Computers have largely replaced pen and paper and typewriting machines to generate document in modern office, school, and home environments. Electronic documents generated using modern computers may include any electronic media content that is intended for presentation to a user in either an electronic form (e.g., as displayed in a graphical user interface (GUI) of a computer) or to be printed out as a physical, published document. Modern computer networks have further enabled the easy and widespread distribution of electronic documents. Through these advancements some foresee or aspire to a paperless society, where hardcopy documents are replaced entirely by electronic versions of the same. Electronic documents may be implemented in any one of a variety of electronic document file types, including Microsoft Word documents, Portable Document Format (PDF) documents, HyperText Markup Language (HTML) files, OpenDocument files, TeX documents, PostScript documents, and so on. In some cases, specialized document reader programs have been developed to draft electronic documents in a particular format and render the files for presentation and viewing by a user. Companies are also replacing or supplementing product documentation typically provided as a paper booklets with electronic copies of the same. This may allow for reduced use of paper as well as allow users interested in purchasing a product or who have lost their physical copy of product documentation to access an electronic copy of the documentation over a network, such as the Internet, in lieu of accessing a physical version of the documentation.

BRIEF SUMMARY

According to one aspect of the present disclosure, a documentation file may be received that includes a plurality of sections and user system parameter data can be accessed that identifies attributes of a computing system of a particular user. A subset of the plurality of sections can be determined for presentation to the particular user based on the attributes of the computing system and a value for inclusion in content of a particular one of the subset of sections can be determined based on the attributes. A customized version of the documentation file can be generated and presented on a display device that includes the particular section, omits sections in the plurality of sections outside the subset of sections, and includes the value in presentation of the particular section, among other examples such as described and shown herein.

BRIEF DESCRIPTION OF THE DRAWINGS

Like reference numbers and designations in the various drawings indicate like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely software (including firmware, resident software, micro-code, etc.) or combining software and hardware implementations that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Figure 1:
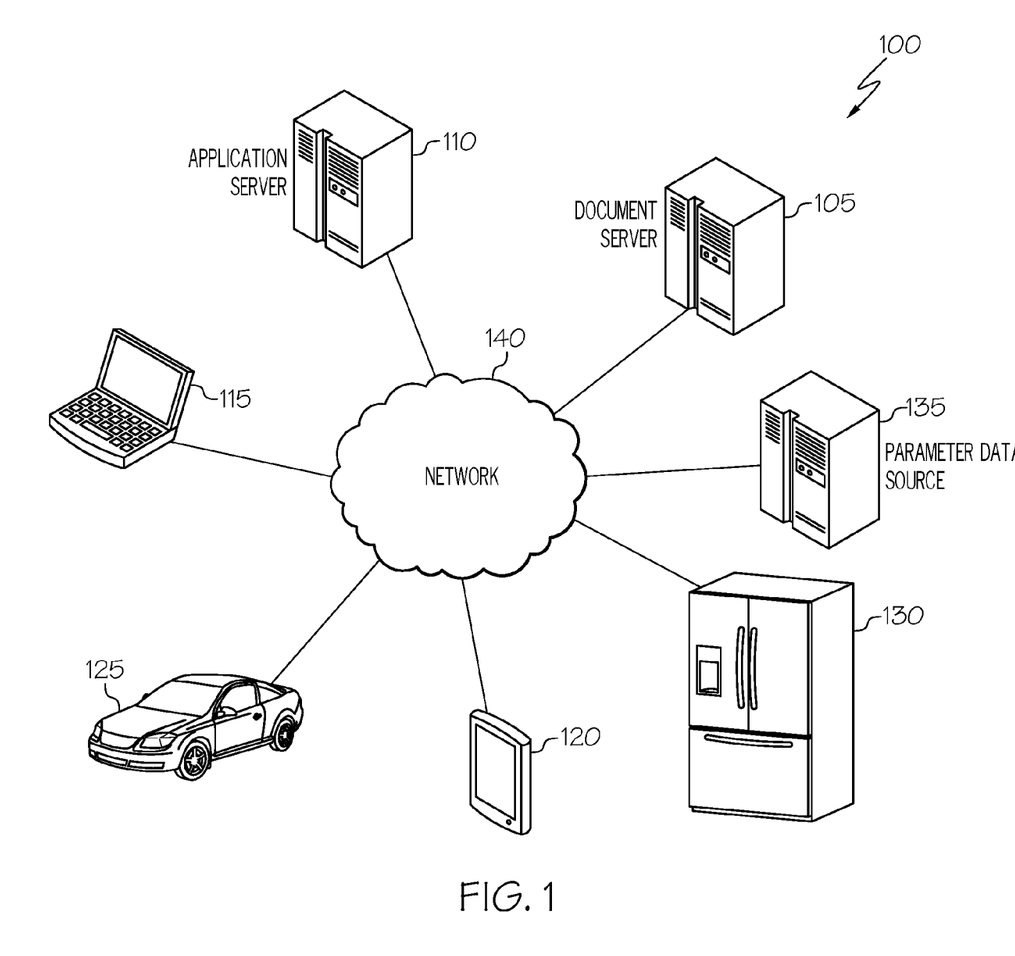
FIG. 1 is a simplified schematic diagram of an example computing system including an example documentation server system in accordance with at least one embodiment.

Referring now to FIG. 1, a simplified block diagram is shown illustrating an example computing environment 100 including a documentation server system 105 and a variety of different systems (e.g., 110, 115, 120, 125, 130, etc.) for which various documentation may be authored and provided (e.g., through one or more documentation servers (e.g., 105)). Systems may include, for instance, an application server system 110, which may host and/or serve one or more software applications and services to various client systems. Such applications and services may include software development utilities, business applications, security applications, search engines, video games, social networks, among potentially limitless other examples. Services offered by an application server 110 may interface with and support a variety of other systems. Indeed, some systems (e.g., 115, 120, 125, 130, etc.) may also serve as clients or consumers of services provided by one or more application servers (e.g., 110). Systems may include client, user, internet of things (IoT), and other systems (e.g., 115, 120, 125, 130) may include computing resources to make the system "smart" and/or connect the system to one or more computer networks (e.g., 140). In this sense, systems may embody both conventional computing systems, such as personal computers (e.g., 115) and mobile devices (e.g., 120), such as laptops, tablets, smartphones, set-top-boxes, video game systems, etc., as well as smart devices such as wearables, smart appliances (e.g., 130), in-vehicle computers, other IoT devices, among other diverse examples.

Documentation produced for a given service, device, application, network, peripheral, or other system may be offered for presentation through a graphical display of the system itself or through the graphical display of another system. For example, an in-vehicle computer may include a graphical display for the presentation of various graphical user interfaces (GUIs), as well as logic (e.g., a reader application or utility) to allow an electronic copy of corresponding documentation to be presented in the in-vehicle computer's own display. Alternatively, or additionally, a reader of another device (e.g., a smartphone, tablet, or other general purpose computing device) may be used to present documentation for a system to a user. Documentation may be closely tied to a particular system and may be accessed (as noted above) through a reader associated with the system or a generic reader. In some cases, the documentation may be provided in connection with a search (e.g., using a search engine hosted locally or as a service on a remote server (e.g., 110), among other examples.

In some implementations, documentation may be generated to be customized to the specific characteristics of a system and/or the user that is to read and use the documentation. A documentation system 105 may provide documentation as a template or as data, which may be transformed into a template, that may be processed at a user device to generate the customized version of the document at the user device. Parameter data may be obtained or otherwise accessed that describes characteristics of the system and/or user and the parameter data may be used to filter out irrelevant (or less relevant) content from a document or document template received from the documentation server 105 to generate the customized version of the document. The parameter data may be additionally used to customize values in the content of the document itself to generate the customized version of the document, among other features.

Parameter data may be obtained from a user directly, through automated monitoring or detection of characteristics of a particular system instance and its use, or from repositories of parameter data (e.g., 135), among other examples.

In general, "servers," "clients," "computing devices," "network elements," "database systems," "user devices," and "systems," etc. (e.g., 105, 110, 115, 120, 125, 130, 135, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing device. For example, elements shown as single devices within the computing environment 100 may be implemented using a plurality of computing devices and processors, such as server pools or cloud-based, virtual implementations of a device or system, which are actually implemented using multiple computing devices. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, network elements, systems, and computing devices (e.g., 105, 110, 115, 120, 125, 130, 135, etc.) can each include one or more processors, computer-readable memory, and one or more interfaces, among other features and hardware. Servers can include any suitable software component or module, or computing device(s) capable of hosting and/or serving software applications and services, including distributed, enterprise, or cloud-based software applications, data, and services. For instance, in some implementations, a documentation server system 105, application server 110, parameter data source server 135, or other sub-system of computing environment 100 can be at least partially (or wholly) cloud-implemented, web-based, or distributed to remotely host, serve, or otherwise manage data, software services and applications interfacing, coordinating with, dependent on, or used by other services and devices in environment 100. In some instances, a server, system, subsystem, or computing device can be implemented as some combination of devices that can be hosted on a common computing system, server, server pool, or cloud computing environment and share computing resources, including shared memory, processors, and interfaces.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Modern information networks, such as the Internet, offer and provide users with vast amounts and diversity of information. Access to such information has been made incredibly simple, however, navigating through this information to identify and access the "right" information remains a challenge. In many cases, information asymmetries exist between the authors of information and users seeking to make use of this information. Accordingly, it can be difficult for users to sort out the information they need for the task or research they are performing (e.g., within their respective domain and according to their lay expertise) from the information that may be above and beyond the user's immediate need. Further, users may need to supplement information they receive with additional information to help them understand the contents or use of the initial information—users desire to obtain the information that is both understandable and relevant to their personal interest with minimal effort.

Documentation offerings on the web can be overwhelming, both in the variety and in their content. For instance, a user may be confronted with many documents, articles, and pages, many of which do not apply to the user's particular interests and situation. Further, as documents are typically authored for a wide audience (i.e., to allow the work input to generate the document to apply across multiple different scenarios and contexts), documents are often phrased in general terms and do not reflect the specific situation and environment of the user. This makes consumption of the document more difficult to users (particularly inexperienced or lay users).

In one implementation, a system may be provided to produce customized documentation that uses an original version of a document as an input, filters the document to narrow down the content to what is relevant to the user and automatically merges user specific information into the document content in order to produce a personalized version of the documentation specific to an individual users need. A single original document may thus serve as a template from which multiple different personalized versions may be generated. Further, in some implementations, these personalized documents may be produced "on the fly," such that the personalized version of the document is generated locally at a user system using information collected at the user system or another system associated with the user. This can allow such personalized documents to additionally be generated without storage or transmission of confidential data.

Figure 2:
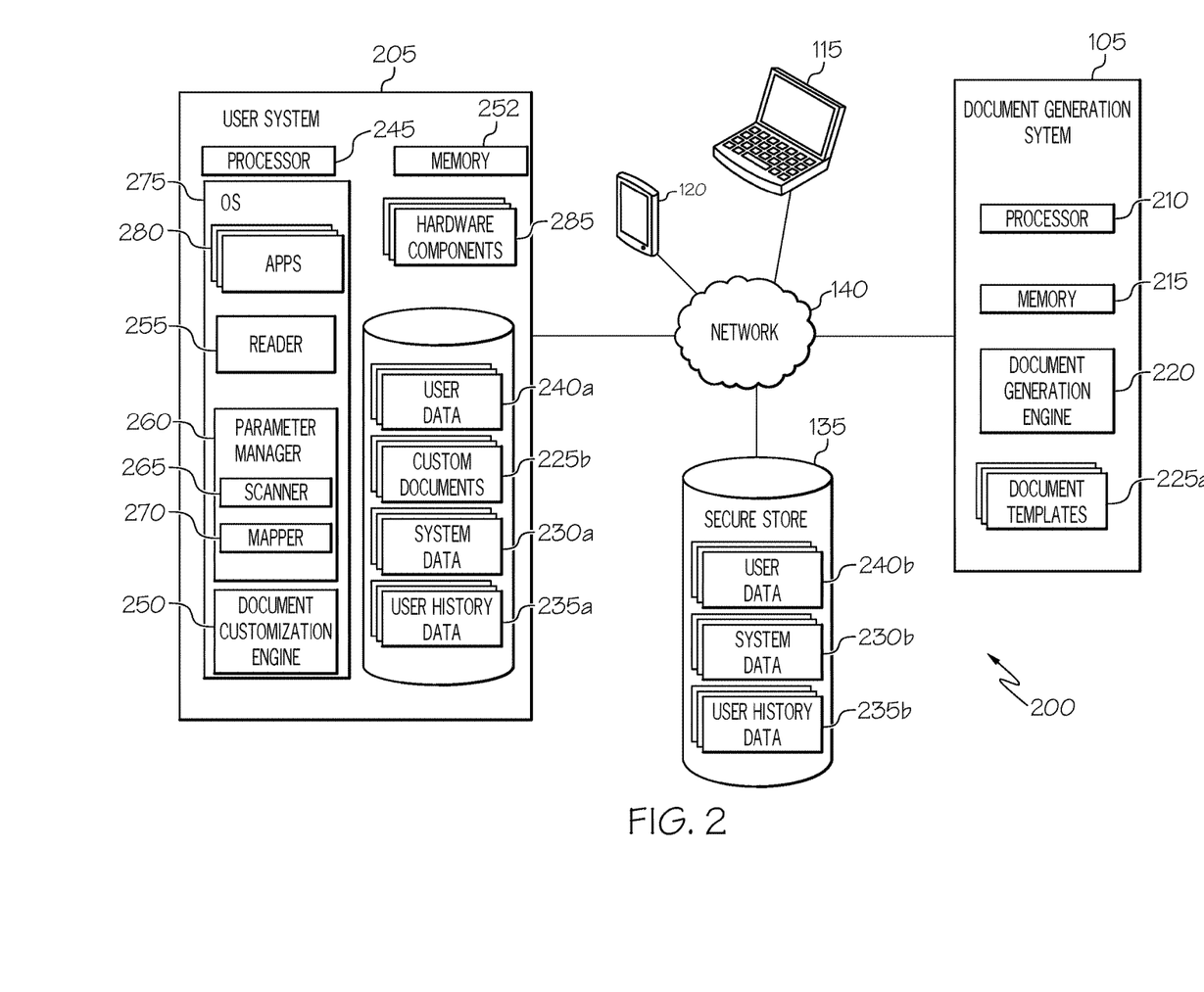
FIG. 2 is a simplified block diagram of an example computing system including a user system and a document customization engine in accordance with at least one embodiment.

Turning to FIG. 2, a simplified block diagram is shown illustrating an example system capable of being used in connection with the generation of customized documents. In one example, a document generation system 105 may be provided, which may serve document files (e.g., 225a) to one or more user systems (e.g., 205) for use by the user system in generating a customized version of a document (e.g., 225b) for presentation at the user system 205 (and/or other associated and trusted systems (e.g., user devices 115, 120)). In one example, a document generation system 105 may include one or more data processing apparatus (e.g., 210), one or more computer memory elements (e.g., 215), and computer-executable logic to implement a document generation engine 220. In one example, a document generation engine 220 may generate document template files that correspond to a particular document. In some implementations, a particular document may be originally generated as a document template 225a. In other cases, document generation engine 220 may be utilized to translate a document from a first format (e.g., HyperText Markup Language (HTML), Portable Document Format (PDF), Microsoft Word file, etc.) into a document template format compatible with one or more document customization engines (e.g., 250). A document generation system 105 may itself host the document templates 225a and provide the document templates to various user systems (e.g., 115, 120, 205) over one or more networks 140. In some cases, a document generation system 105 may provide document templates 225a to other data servers, such as server systems associated with a system or service discussed in content of the corresponding document template 225a. As an example, a provider of a software application may desire to provide documentation to its users to provide instructions for the use of the application. Depending on the configuration and attributes of the system that is to run the application, the provider of the software application may develop content that is over-inclusive and discusses each one of the various scenarios and contexts that may arise given the diverse systems, which may be used with the application. A document template may be generated for this documentation and a system associated with the provider of the software application may host the template (e.g., as generated using document generation engine 220) for delivery to various user systems 205 (e.g., in connection with the installation or registration of the software application with a user system or user associated with the user system.)

In some implementations, a user system 205 may include logic (e.g., 250) to autonomously identify characteristics associated with the user system 205 and/or its user and generate a customized document 225b from a received document template that is based on the identified characteristics. In one example, a user system 205 may include one or more processor apparatus (e.g., 245) and one or more memory elements (e.g., 252) to execute programs and logic including an example document customization engine 250, document reader 255, and parameter manager 260. In some instances, a user system 205 may include an operating system 275, whereon one or more applications (e.g., 280) may run, including programs (e.g., 260, 265, 270) utilized to generate and view customized documents (e.g., 225b).

In one example, a document customization engine 250 may interoperate with a parameter manager 260 to determine parameters of a system that corresponds to a particular document to be presented to a user. A variety of documents may provide information concerning a variety of different systems. In one example, the user system 205 may be implemented as an in-vehicle computer and the system may be the corresponding vehicle (and its composite sub-systems). In this example, documentation may be provided that describes the operation, maintenance, and features of the vehicle. In another example, the user system 205 may be personal computer and the system may be the user system itself, one or more applications (e.g., 280) of the user system, one or more peripherals or other hardware components (e.g., 285) of the user system, another system (e.g., an IoT device, set top box, etc.) through which the user may interface using the user device, a remotely hosted software service accessible using the user system, among other examples. Systems for which documentation may be generated include such additional examples as video game consoles (and/or games playable through the console), smart appliances, home automation systems, among many other potential examples.

In some cases, a single system may adopt any one of a variety of parameters or configurations. For instance, multiple versions or models of a single system may be provided. As another example, a system may be deployed or used in any one of a variety of different environments and characteristics of the environment may affect the operation of the system. In yet another example, a system may be updatable and parameters of the system may depend upon the current update or patch applied to the system, among other examples. While varied parameters may be applied to a single system or system type, there may be sufficient overlap between these various versions of the system such that documentation for the system is authored to describe information that may be applicable to any one of these possible system variants (e.g., with some information in the document applicable to every system variant and other information only applicable to subset of the possible system variants). As a result, the document, as authored may include information that is not applicable to some variants of the system. While such an approach may be convenient to the document's author and/or publisher, navigating and filtering through such over-inclusive information may be difficult to a user and even result in information intended for one system variant being incorrectly applied to another system variant, among other example issues.

In one implementation, a parameter manager 260 may obtain parameters for a particular system. Parameters may describe characteristics such as characteristics of software, hardware, and other features of the system. Such system-descriptive parameters may be described in system data (e.g., 230a). System data may be hosted on the user system (e.g., 230a) or may be hosted in a remote data store 135 (e.g., system data 230b). Parameters may additionally describe characteristics of one or more users of the system. User-descriptive parameters may be described in user data (e.g., 240a, 240b). Parameters may further be described in user history data 235a,b describing how corresponding users have used a particular document or documents in the past to inform how to customize the document, among other examples.

As noted, a parameter manager 260 may be employed to identify parameters of a particular instance of a system. In some instances, a parameter manager may obtain at least some of the parameters from a data source, such as a secure data store 135. A data store 135 may be secured so as to maintain privacy and security of user data 240b, system data 230b, user history data 235b, etc. A parameter manager 260 may also obtain parameters from the system itself. For instance, a parameter manager 260 may include a scanner 265 in some implementations to scan or monitor performance of the system to determine parameters of the system. In some cases, a parameter manager 260 may obtain parameters from a log file, installation information, or other data stored locally on the system (or remotely in a secure data store 135). A parameter manager 260 can also detect changes to parameters in real time, such as in response to a system update, change in operating environment, change in user, etc. As a result, parameters used in the generation of a customized document 225b can reflect the real time parameters of a system. In still other examples, a parameter manager 260 may receive parameters as discovered by other monitors of the system (e.g., a monitor internal to or specific to a particular application, hardware component, etc.). In some instances, some parameters may be user-defined, such that a user identifies or defines some parameters through a user interface of the user system. It should be appreciated that a combination of different techniques may be utilized to collect parameter information for a particular system.

In some instances, parameter information may be collected by a parameter manager 260 based on parameters identified in one or more document templates obtained for a corresponding system. For instance, parsable logic within a document template may identify parameter dependencies of the document and a parameter manager 260 may identify these parameter dependencies and map them to parameters detectable or obtainable from data (e.g., 230a, 235a, 240a) or configurations of the corresponding system (e.g., 205) or from a source (e.g., 135) of parameter data, among other examples. In other cases, a parameter manager 260 may proactively obtain parameters for a system, such that a library of parameter data (e.g., 230*a*, 235*a*, 240*a*) is available for use by a document customization engine 250 in connection with potentially any document template that may be obtained for the user system (e.g., in response to a search by a user of the system, etc.). In such cases, the mapper 270 may include logic to parse received document templates to identify parameter dependencies and determine which of the system parameters map to each of the parameter dependencies in the document template. For instance, in one example, the mapper 270 may employ a matching algorithm to determine that a particular system parameter (e.g., by virtue of its name, value, or source (e.g., from related product description data or an installation log)) is sufficiently similar to one of the parameter dependencies identified in the template. In other cases, the logic within the template (corresponding to the identification of a particular parameter dependency) may include information to instruct the mapper 270 as to which system parameters may map to the corresponding parameter dependency. In still other examples, the mapper 270 may query an outside service for assistance in determining which document template parameters (or parameter dependencies) map to which real world system parameters, among other examples.

While the example of FIG. 2 shows the parameter manager logic 260 as separate and distinct from the document customization engine 250, it should be appreciated that all or part of the functionality described for the parameter manager 260 may be alternatively incorporated within the document customization engine 250. Indeed, the parameter manager may be a subcomponent of the document customization engine in some implementations. A document customization engine 250 may access a document template (e.g., 225) and parse the document template to identify logic indicating opportunities to either filter content of the document or insert personalized content into the document template. For instance, the document customization engine 250 may identify mappings between parameter information described in parameter data (e.g., 230*a-b*, 235*a-b*, 240*a-b*, etc.) obtained by the parameter manager 260 and parameter dependencies in the document template. The parameter dependencies may be logic instructions that indicate that presentation of a particular section of content of the document is to be conditioned on certain parameter values being true for a system (e.g., 205). Other parameter dependencies may indicate that particular content is to incorporate a parameter value discovered for the user system, among other examples. The document customization engine 250 may process the document template using parameter values identified in the parameter data (e.g., 230*a-b*, 235*a-b*, 240*a-b*, etc.) to select relevant content and personalize content identified within the document template logic and generate a customized version of the document 225*b* based on the corresponding document template 225*a*. The resulting customized document 225*b* may be provided as a file that may be presented using a reader application 255 of the same user system or a cooperating user system (e.g., 115, 120). For instance, in one example, user system 205 may obtain parameters from another system (e.g., an IoT device), which does not have a reader and/or display. The documentation customization engine of the user system 205 may generate a customized version of a document for the other system and present the customized document to a user through the reader 255 and display of user system 205, among other examples.

Figure 3:
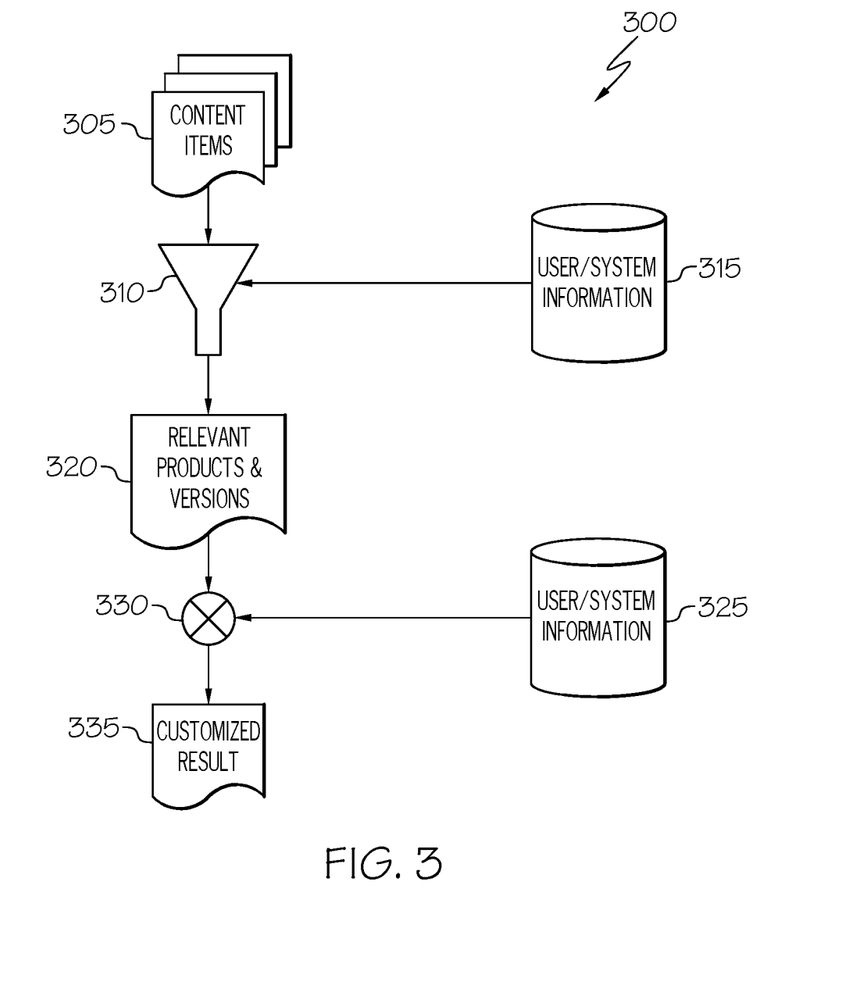
FIG. 3 is a simplified block diagram illustrating example customization of content for inclusion in a customized document in accordance with at least one embodiment.

Turning to FIG. 3, a simplified block diagram 300 is shown illustrating the example generation of a customized document. A document template may be provided that includes a list of items 305 of content that may be included in versions of a corresponding document. In some implementations, a document template may itself be an aggregation of multiple different documents providing the list of items. In still other instances, multiple document templates (including the list of items 305) may be used and processed (according to system and user parameters) to generate a single customized document. Some of the items of content 305 may be relevant to some systems and not others. Accordingly, a document generation engine access system parameter information 315 corresponding to a particular instance of a system and filter (at 310) the list of items to determine a subset of the content that is relevant to the particular instance of the system (e.g., what hardware and software are on the system, the version of the system and its components, updates or patches that have been applied, etc.). In one example, system parameter information may be based on a log file obtained from the system's or product's installation or deployment. For instance, an installation may be characterized by a set of selection variables, which record the specific sub-systems and which components of the sub-systems that have been installed. For a document that potentially describes instructions and information regarding multiple different possible installations (e.g., as reflected in the list of content items 305), the parameter selection variables determined for a particular installation may be used to filter and reduce the list of items 305 to a subset specific to the user's particular installation. The parameter selection variables may be stored such that they may be reused in subsequent attempts to generate and access the customized document for the system. As changes to the installation parameters are detected, the parameter selection variables may be likewise modified to reflect the new parameters of the system.

Parameters other than those describing the system's configuration and components may be used to filter 310 available content that may be included in a customized document (e.g., 335). In one example, user preferences may be determined from user history information (included in information 315). For instance, based on prior accesses of a particular customized document or other documents, additional parameters may be determined (e.g., through a machine learning or other adaptive computing algorithm) based on a pattern of behavior that indicates the user preferences, a level of expertise of the user, content of particular interest to the user, among other examples, and these parameters may also be applied to filter 310 the items 305 for inclusion in a customized document.

In addition to filtering 310 the content that will be returned in a customized document, other system-specific parameter data (e.g., 325) may be identified to customize the filtered content by adding (at 330) system-specific content to the customized document shell. For instance, some information that may be included in a document may ordinarily make vague reference to particular parameters or instruct a user to gather information before being allowed to proceed to or fully understand particular content to be included in a document. For instance, a content of a document may instruct a user to enter a user name, IP or MAC address, identify a product serial number, select a particular network name, among various other examples. In some implementations, document template may include tags that may be mapped to particular parameter values specific to a system, system installation, user, etc. These tags may be populated with the parameter values to cause these values to be incorporated in the content that is ultimately included in a customized document. Accordingly, instead of presenting a user with generalized content, a customized document can include content that is personalized specific to a user's instance of a system, among other example features and advantages.

Figure 4:
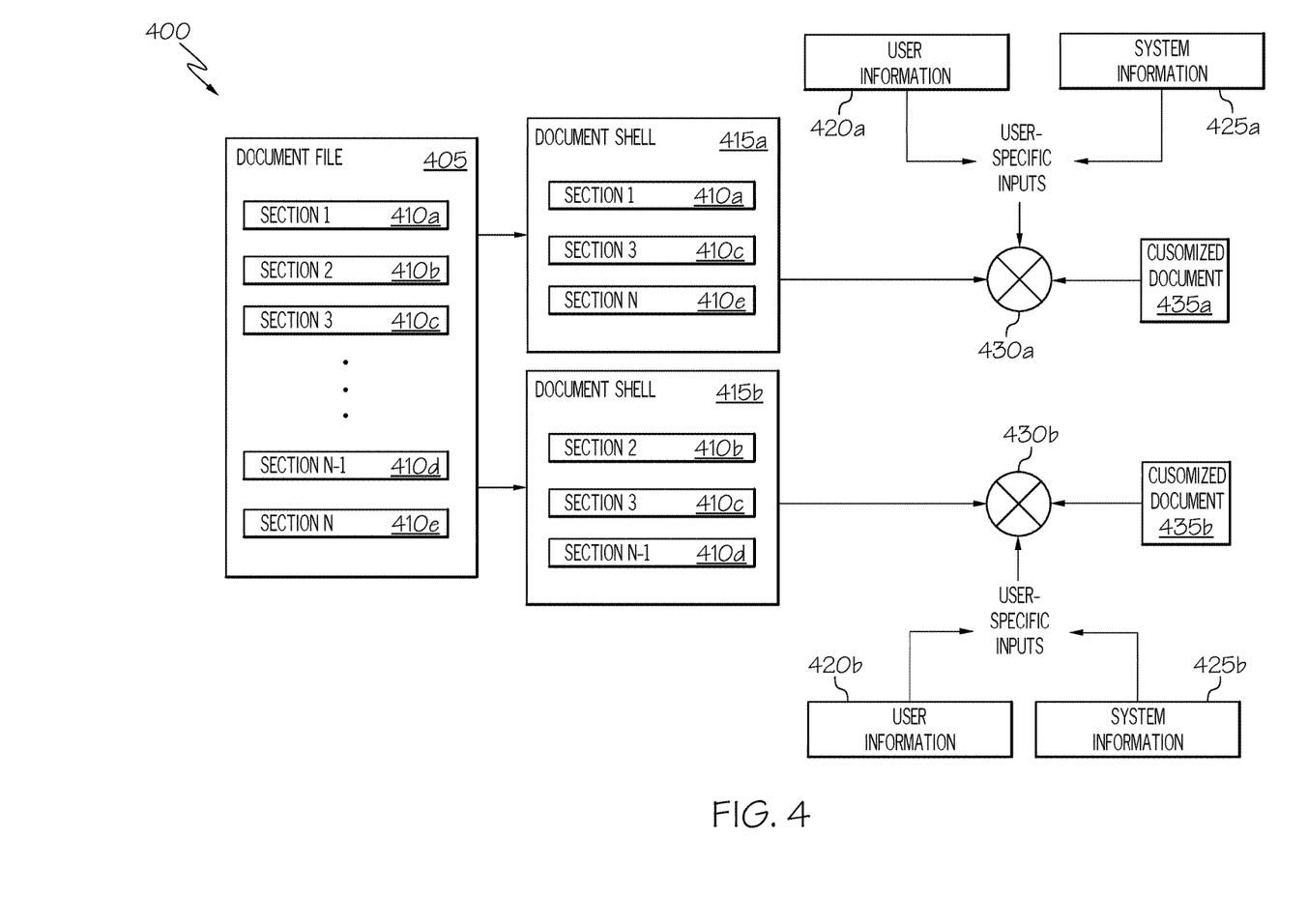
FIG. 4 is a simplified block diagram illustrating example generation of multiple different customized documents from a document template in accordance with at least one embodiment.

Turning to FIG. 4, a simplified block diagram 400 illustrates a more detailed example of the generation of multiple customized documents from a particular document template. For instance, a document file 405 may be provided which represents all of the content one or more authors may develop for a particular document. In some cases, the document file 405 may be a standard version of a document, which may be provided to some users (e.g., users without access to document customization functionality). The document file 405 may incorporate an exhaustive number of sections (e.g., 410*a-e*) to address any one of several alternative variants and/or various amounts of detail for consumption by any one of a variety of users (e.g., having differing levels of expertise and differing system implementations). The document file 405, in such instances, may be converted into a document template capable of being processed to develop various customized versions (e.g., 435*a-b*) of the document. In other instances, the document file 405 may be originally authored as a document template (e.g., using an existing or proprietary mark-up language compatible with a document customization engine) that incorporates logic that defines parameter selection variables to conditionally include one or more of the sections (e.g., 410*a-e*) as well as tags defining opportunities to add personalized content to the template to generate customized documents (e.g., 435*a-b*).

In the particular example of FIG. 4, a document file 405 may be implemented as (or converted into) a document template and parameters of a first system may be used to determine that a first subset of the document sections (e.g., 410*a, c, e*) are relevant to the first system, resulting in a first filtered document shell 415*a*. Another set of parameters may be identified for a different second system and the document template may be processed to produce a second document shell 415*b* that includes those sections (e.g., 410*b-d*) that are relevant to systems with the other set of parameters. Tags present in the sections included in either of the document shells 415*a,b* may be further identified (e.g., by a document customization engine). Additional parameters of the first system may be identified, such as user information 420*a* and system information 425*a* that correspond to tags included in the first subset of sections (e.g., 410*a, c, e*) included in the first document shell 415*a*. These parameter values may be provided as user-specific inputs to the document and may replace the tags included in the document shell 415*a* to generate a customized document 435*a* that includes the subset of sections (e.g., 410*a, c, e*) and the user specific content (added at 430*a*). Likewise, user information 420*b* and system information 425*b* may identified for the second system that correspond to tags identified in the second subset of sections (e.g., 410*b-d*) included in the second document shell 415*b* developed for the second system instance. These values may be likewise added (at 430*b*) to populate the tags and generate a customized document 435*b* that incorporate both the user-specific tag values and the second subset of sections (e.g., 410*b-d*).

Figure 5:
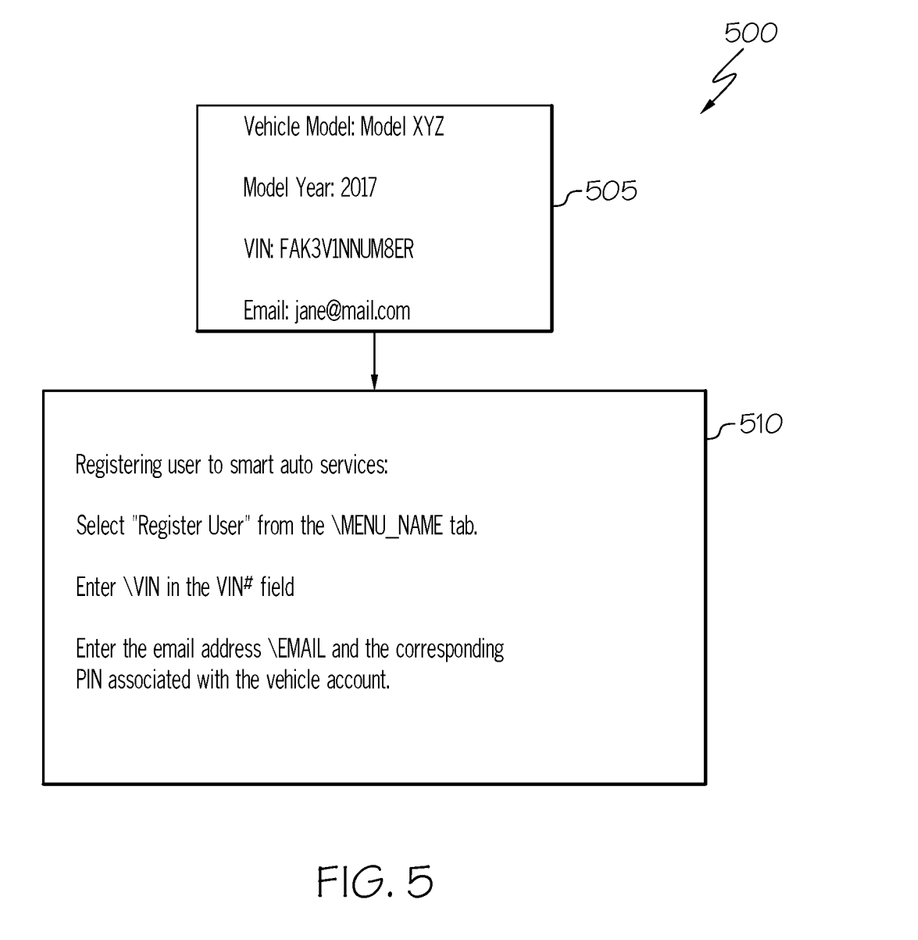
FIG. 5 is a simplified block diagram illustrating incorporating user- or system-specific information in a customized document in accordance with at least one embodiment.

Turning to FIG. 5, a simplified example is illustrated of tags embedded in a portion of a section 510 selected for inclusion in a customized document (e.g., based on particular parameters identified for a corresponding system). In this example, the document may pertain to services provided for an automobile equipped with an in-vehicle computer, with the document adapted for presentation through a reader resident on the in-vehicle computer, a smart phone of the car owner, or another computing device with a graphical display. A parameter file (e.g., 505) may be identified or developed that corresponds to the vehicle and describes various parameters of the vehicle. These parameters may be general parameters that are identified for the car or, alternatively, may be parameters specifically detected or fetched from the car's systems. For instance, the parameter may be set at manufacture of the car and defined in a log or other data resident in the car's in-vehicle computer. Alternatively (or additionally), a parameter manager may include a scanner or monitor to detect parameters of the car (e.g., scan the car's system to determine what subsystems are incorporated in the car), or may fetch these parameters by querying an outside system (e.g., a service provided by the car manufacturer) for the specific parameters of the car, among other examples.

A combination of techniques may be used to assemble a collection of parameters (e.g., as in 505) for use in filtering content of a corresponding document and/or populating tags incorporated in the document. The document, in the example of a car, may provide a user's guide directing how to use and maintain various systems of the car. However, depending upon the model year, package, build, etc., some of the document content may only be relevant to a subset of the cars produced. The parameters may be used to generate a customized version of the document that only includes those sections germane to a particular user's car. Parameters may also be used to fill-in specific portions of the document content to further assist and customize the document to a user. For instance, in the example of FIG. 5, a section of the document 510 may include tags \MENU_NAME, \VIN, and \EMAIL. The parameters 505 may include such examples as the vehicle model name (e.g., "Model XYZ"), the vehicle's model year (e.g., 2017), the vehicle identification number (VIN) (e.g., "FAK3V1NNUM83R"), and user email address registered to an account associated with the car (e.g., "jane@mail.com" registered with the car manufacturer, service department, or dealership, etc.).

The parameters 505 may be used to populate the tags included in the document section 510. In some instances, the value for a tag may be explicitly mapped to the value of one of the parameters 505. For instance, the \VIN and \EMAIL tags may be replaced with the values determined for "VIN" and "Email" in the parameter file 505. In other instances, one of a set of potential values may be defined for a given tag and corresponding logic defined within the document template may define values of one or more parameters that result in a particular one of these potential values being selected for incorporation in the resulting content the customized document. For instance, a particular car manufacturer may have produced a number of different in-vehicle computers with varying graphical user interfaces, depending on the specific model and model year (e.g., a first GUI menu may be used in a current model year that is at least slightly different from a second GUI menu used in an earlier model year). In the example of FIG. 5, the \MENU_NAME tag may have corresponding logic to cause a document customization engine to select an appropriate GUI menu name based on the model and model year parameter values for the car. The document customization engine may likewise determine values for each of the tags included in any one of the sections selected for inclusion in a customized document to generate a file for the customized document for presentation using a compatible reader application.

In some instances, it may not be desirable or permissible to share system or user parameters without outside or untrusted systems. Otherwise, in some implementations, documentation servers may be provided with system or user-specific parameters and generate customized documents from a common document template as a service for multiple different systems. Where data privacy and security do not allow for the parameters to be shared outside of a particular user system or network, parameters may be determined and stored locally at the corresponding system or uploaded to a trusted secure data repository for access by the host of the document customization engine. In some cases, a trusted relationship or authentication can be performed to allow parameter data to be shared with the host of the document customization engine or data store (i.e., in cases where the parameter data and document customization engine are hosted on a system separate from the system, which determines the parameters), among other examples.

Figure 6:
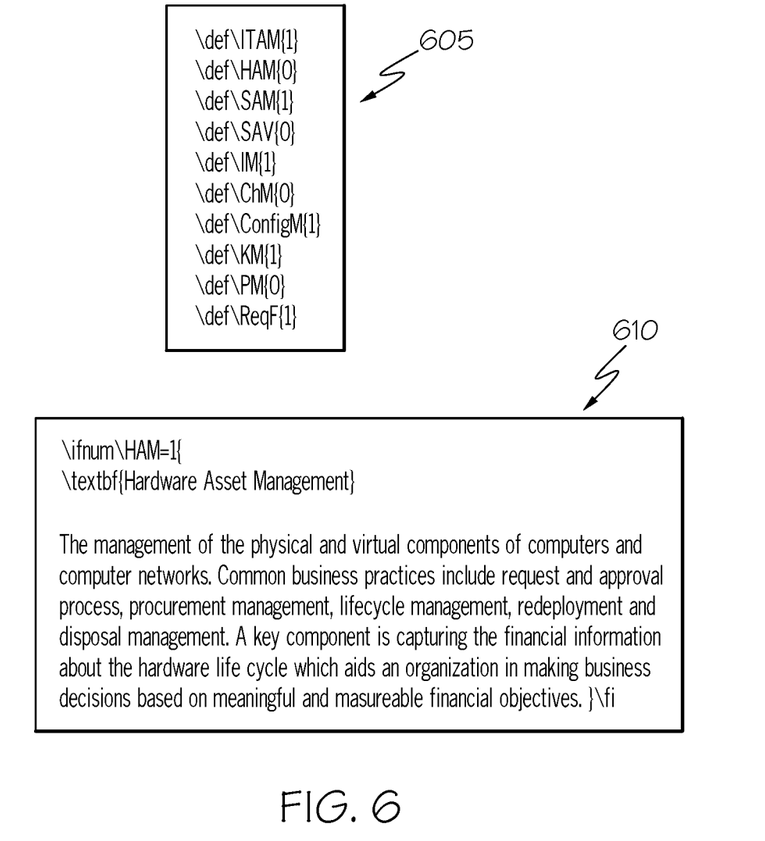
FIG. 6 is a simplified block diagram illustrating a portion of an example document template including logic to conditionally select portions of document content for inclusion in example customized documents in accordance with at least one embodiment.

Turning to FIG. 6, another example is shown of a portion of a document template and the use of system parameter information to determine a subset of the document template content to include a customized document. For instance, parameter data 605 may define values for a number of parameters of a particular system. A document template may include logic defining how one or more (e.g., a combination) of parameter values may drive whether a particular section of the document template is to be included in a particular customized document. For instance, a portion 610 of an example document template is shown which includes executable code implementing logic to determine what parameter values correspond with an associated section of the document being relevant to a particular system. For instance, the segment 610 include logic indicating that if a parameter "HAM" has a value equal to "1", then a text section entitled "Hardware Asset Manager" is to be included in a customized document for a system having the parameter HAM{1}. In the example of FIG. 6, the parameter data 605 of a particular system indicates a value of HAM{0}, resulting in the "Hardware Asset Management" section being withheld from the customized document generated for the particular system from the document template.

While some of the examples herein discuss the selective inclusion of text-based content within a customized document based on parameters identified for a corresponding user system, it should be appreciated that non-text content may also be selectively included or omitted depending on the respective parameters identified for a system. For instance, particular graphics (e.g., circuit diagrams, schematic figures, architectural drawings, etc.) may be identified that only relevant to particular variants of a system and a particular one of the graphics included in a document template may be selected based on the specific parameters identified for a particular system. Likewise, "documents" and "documentation" may, in some cases, include multimedia presentations with audio, video, and interactive content being likewise selectively included based on the particular parameters of a system, among other examples.

Figure 7:
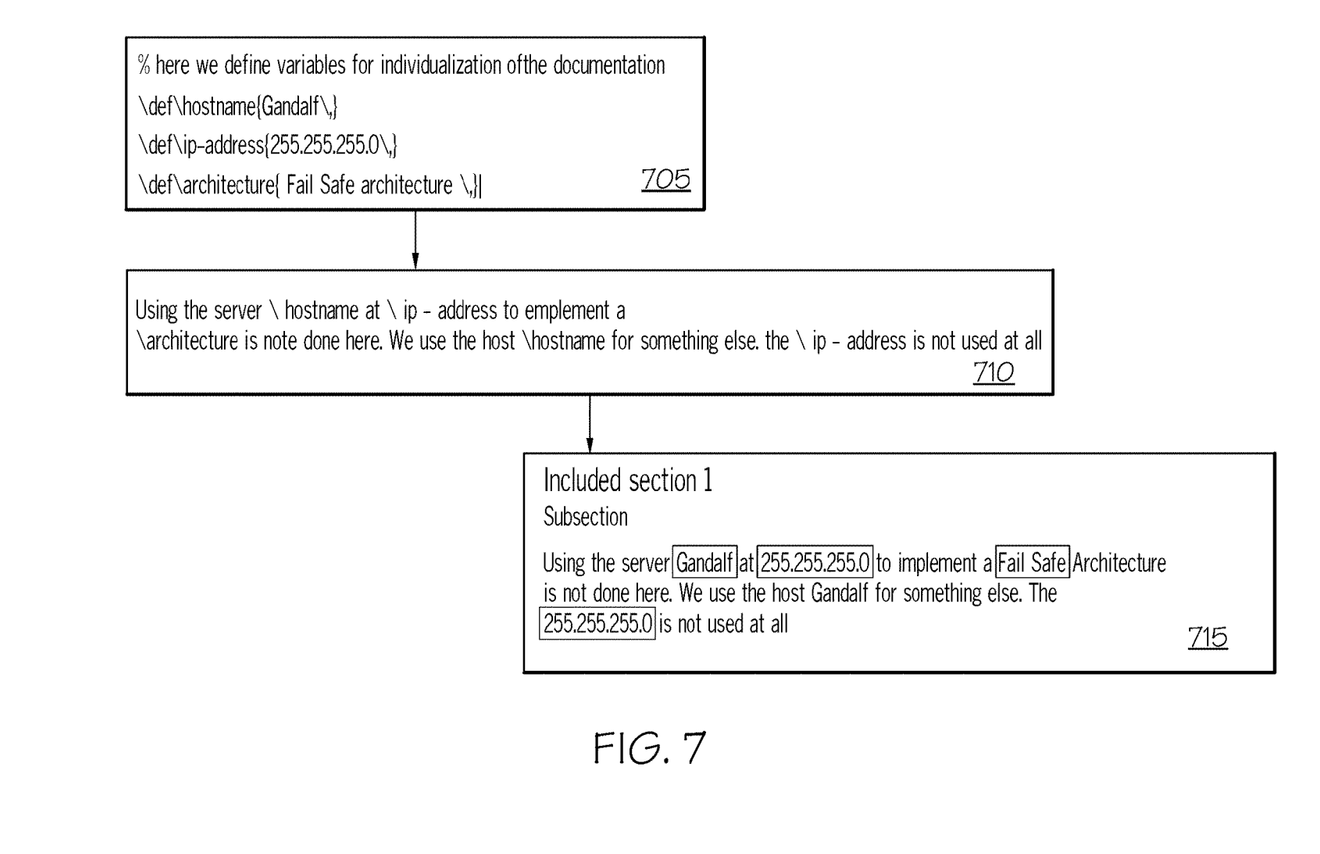
FIG. 7 is a simplified block diagram illustrating a portion of an example document template including logic to incorporate user- or system-specific information in a customized document in accordance with at least one embodiment.

Turning to FIG. 7, another example is shown illustrating the personalization of a customized document shell with content to populate various tags included within the document shell (and defined in a corresponding document template). For instance, in this example, a portion of a parameter file or parameter data (e.g., 705) may include parameters defining inputs or values that may be used to populate one or more tags in the document shell. In this example, parameter variables are defined including a hostname, IP address, and architecture parameters. A section 710 of an example document template is further illustrated including tags (e.g., "\hostname", "\ip-address," and "\architecture") which may be populated according to the value defined in the parameter data 705. Accordingly, a published version of a customized document may be generated that includes the published section 715 with the specified parameter values, as illustrated in FIG. 7.

Figure 8:
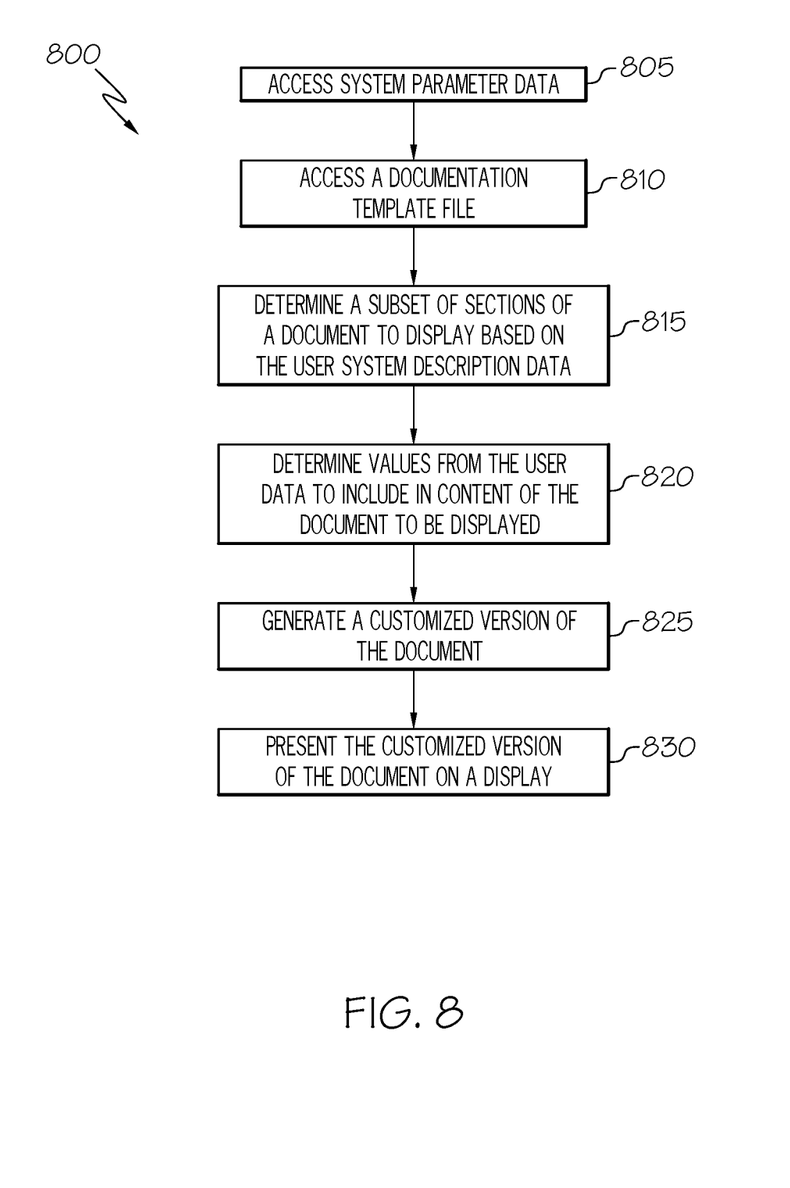
FIG. 8 is a simplified flowchart illustrating an example automatic generation of a customized document in accordance with at least one embodiment.

Turning to FIG. 8, a simplified flowcharts 800 is presented illustrating an example technique for generating a customized document based on parameters determined for a user's system. Parameter data may be accessed 805 (e.g., from local memory or a remote data store) that describes parameters of a particular user system, such as attributes of the user, hardware of the system, software of the system, a network to which the system is connected, etc. A documentation template file may be accessed (e.g., received from a server system) and a documentation generation engine may process the documentation template file to identify executable logic defining opportunities to customize a corresponding document to the particular attributes of a specific user system. The parameter data may be used to determine 815 a subset of section of the document to include in a customized version of the document based on one or more of the attributes described in the parameter data. Additionally, values may be determined for one or more tags, or content placeholders, defined in the documentation template file based on values of the parameter data. With the particular subset of document sections selected and any tags populated with user system-specific values based on the parameter data, a customized version of the document may be generated 825 that is adapted for presentation 830 using one or more different electronic document readers, among other example features.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
   receiving, from a computer, a documentation file comprising a plurality of sections;
   scanning a computing system associated with a particular user based on receipt of the documentation file to determine user system parameter data identifying attributes of the computing system of a particular user, wherein the attributes comprise attributes private to the computing system and unavailable to a provider of the documentation file;
   determining, using a data processing apparatus, that a subset of the plurality of sections are to be presented to the particular user based on the attributes of the computing system;
   determining, using a data processing apparatus, a value for inclusion in content of a particular one of the subset of sections based on the attributes; and
   generating, using a data processing apparatus, a customized version of the documentation file for presentation on a display device, wherein the customized version comprises the particular section, omits sections in the plurality of sections outside the subset of sections, and comprises the value in presentation of the particular section.

2. The method of claim 1, wherein the user system parameter data is generated at least in part by the computing system from a scan of at least a part of the computing system.

3. The method of claim 1, where the user system parameter data is generated in part based on inputs provided by the particular user, wherein the inputs define at least a portion of the attributes.

4. The method of claim 1, wherein the attributes comprise configurable attributes of the computing system.

5. The method of claim 1, wherein the documentation file is received from a remote server system.

6. The method of claim 1, wherein the documentation file comprises data to be rendered to present user documentation for the computing system.

7. The method of claim 6, wherein the documentation file comprises documentation for a plurality of different computing systems, the subset of the plurality of sections correspond to documentation for a particular one of the plurality of different computing systems, and the sections outside the subset of sections do not pertain to the particular one of the plurality of different computing systems.

8. The method of claim 1, wherein the attributes comprise one of hardware components of the computing system and software installation information of the computing system.

9. The method of claim 1, wherein the value comprises one of a system identifier, user identifier, and network identifier corresponding to the computing system.

10. The method of claim 1, wherein the documentation file comprises logic to selectively disable presentation of each of the plurality of sections based on values of a respective one of the attributes.

11. The method of claim 1, wherein the documentation file comprises a tag to indicate a variable value of the content of the particular section and the value is to be provided as the variable value of the tag.

12. The method of claim 11, wherein the value comprises a value of one of the attributes of the computing system.

13. The method of claim 11, wherein the documentation file comprises a markup language document.

14. The method of claim 11, further comprising:
    determining that a particular one of the attributes corresponds to the tag; and
    using a value of the particular attribute as the variable value.

15. The method of claim 1, further comprising:
    monitoring user behavior of the particular user relating to use of the documentation file; and
    determining user preferences for the documentation file based on the user behavior;
    wherein the subset of the plurality of sections are determined to be presented based further on the user preferences.

16. A non-transitory computer readable medium having program instructions stored therein, wherein the program instructions are executable by a computer system to perform operations comprising:
    receiving, from a computer, a documentation template corresponding to documentation for a plurality of computing systems, the documentation template comprising a plurality of sections;
    scanning a computing system associated with a particular user based on receipt of the documentation template to determine user system parameter data identifying attributes of a particular computing system of a particular user, wherein the attributes comprise attributes private to the computing system and unavailable to a provider of the documentation file;
    determining that a subset of the plurality of sections are to be presented to the particular user based on the attributes of the particular computing system;
    determining a value for inclusion in content of a particular one of the subset of sections based on the attributes; and
    generating a customized version of the documentation for presentation on a display device, wherein the customized version is generated from the documentation template and comprises the particular section, omits sections in the plurality of sections outside the subset of sections, and comprises the value in presentation of the particular section.

17. A system comprising:
    a data processor;
    a memory to store one or more document files, wherein the one or more document files comprise a plurality of sections comprising content relating to support of a user computing system; and
    a scanning utility executable by the data processor to scan the user computing system based on a request to open documentation corresponding to the user computing system, wherein the scan generates attribute data describing attributes of the user computing system, and the attributes comprise attributes private to the computing system and unavailable to a provider of the documentation file;

a document customization engine, executable by the data processor to:

access attribute data describing attributes of the user computing system;

select a subset of the plurality of sections of the one or more document files for presentation based on first attributes described in the attribute data;

identify a tag in a particular one of the subset of sections, wherein the tag defines a variable value in content of the particular section;

determine that a particular attribute value in the attribute data corresponds to the tag; and generate a customized version of the document file, wherein the customized version of the document comprises the particular section, omits sections in the plurality of sections outside the subset of sections, and comprises the particular attribute value in presentation of the particular section; and a reader executable by the data processor to present the customized version of the document file on a display device.

18. The system of claim 17, wherein the user computing system comprises a software system and the first attributes comprise one of a software installation date, version identifier, patch identifier, component listing, operating system identifier, and serial number.

19. The system of claim 18, wherein the first attributes further comprise attributes of a hardware system hosting the software system.

20. The system of claim 17, wherein the user computing system comprises one of a smart appliance, an Internet of Things (IoT) device, and an on-board computer of a vehicle.

* * * * *